US012141872B2

(12) United States Patent
Wolfberg

(10) Patent No.: US 12,141,872 B2
(45) Date of Patent: Nov. 12, 2024

(54) SECURITIZATION OF ASSETS UTILIZING DISTRIBUTED-LEDGERS AND SMART METERS AND A USER PERMISSION FRAMEWORK FOR INFORMATION FLOW

(71) Applicant: Darren Wolfberg, Chappaqua, NY (US)

(72) Inventor: Darren Wolfberg, Chappaqua, NY (US)

(73) Assignee: Triangle Systems, Inc., Chappaqua, NY (US)

( * ) Notice: Subject to any disclaimer, the term of this patent is extended or adjusted under 35 U.S.C. 154(b) by 30 days.

(21) Appl. No.: 17/891,608

(22) Filed: Aug. 19, 2022

(65) Prior Publication Data

US 2023/0091805 A1 Mar. 23, 2023

Related U.S. Application Data

(63) Continuation of application No. PCT/US2021/024942, filed on Mar. 30, 2021.

(60) Provisional application No. 63/302,276, filed on Jan. 24, 2022, provisional application No. 63/101,054, filed on Apr. 14, 2020.

(51) Int. Cl.
G06Q 40/06 (2012.01)
G06Q 40/02 (2023.01)

(52) U.S. Cl.
CPC ............. *G06Q 40/06* (2013.01); *G06Q 40/02* (2013.01); *G06Q 2220/00* (2013.01)

(58) Field of Classification Search
CPC ..................................................... G06Q 40/06
USPC ........................................................ 705/35
See application file for complete search history.

(56) References Cited

U.S. PATENT DOCUMENTS

| 2006/0293985 | A1* | 12/2006 | Lederman | G06Q 40/00 |
| | | | | 705/35 |
| 2015/0094968 | A1* | 4/2015 | Jia | G05B 15/02 |
| | | | | 702/60 |
| 2017/0358041 | A1 | 12/2017 | Forbes, Jr. et al. | |
| 2020/0311816 | A1* | 10/2020 | Calvin | H04L 9/50 |

* cited by examiner

*Primary Examiner* — Cho Kwong

(57) ABSTRACT

Methods, systems and apparatus for using blockchain distributed ledgers to build and maintain infrastructure projects utilizing smart meters and smart contracts to increase information flow in the securitization of digital securities which are issued to fund and administer the infrastructure projects and to provide transparent and predictable returns to investors and efficient capital formation and infrastructure management to the digital security Issuers.

22 Claims, 10 Drawing Sheets

SECURITIZATION OF ASSETS UTILIZING DISTRIBUTED-LEDGERS AND SMART METERS AND A USER PERMISSION FRAMEWORK FOR INFORMATION FLOW

FIELD OF THE DISCLOSURE

The present disclosure relates generally to digital securities for use in analysis and administration of infrastructure building, financing, and monitoring, and other salient activities, related to infrastructure. More specifically, the present disclosure relates to the securitization over distributed ledgers through the use of smart meters and smart contracts to provide a financing vehicle for infrastructure development and the management of such developed infrastructures.

BACKGROUND OF THE DISCLOSURE

The design, development and financing of large-scale infrastructure projects is complex and requires careful analysis, management, and oversight functions. Especially as these tasks relate to project financing, the various functions of raising and maintaining capital for these projects, and the operation and management of the return of capital requirements for these projects, requires evolving and detailed modalities to achieve operational efficiency and success. Infrastructure projects, for example, energy plants (fossil-fuel, nuclear, hydroelectric, solar, wind etc.), water supply (transport, purification, distribution, wells, dams reservoir, storage, pipes, aqueducts, etc.), transportation systems (highways, toll roads, bridges, airports, marine terminals, canals, trucking terminals, warehouses, rail, etc.) are all non-limiting examples of the types of complicated projects undertaken throughout the world which cannot be realized without efficient raising and management of capital on both the governmental and private levels.

The modern use of distributed ledgers provides a way to achieve securitization of large-scale infrastructure projects. As is known by those with skill in the art, a distributed ledger is a consensus of replicated, shared, and synchronized digital data geographically spread across multiple sites, countries, or institutions. Typically, there is no central administrator or centralized data storage for distributed ledgers, and they are usually implemented over peer-to-peer networks that rely on consensus algorithms for their efficacy. In a blockchain system, which is a dynamic and expandable list of records, called blocks, that are linked using cryptography, the distributed ledger can record transactions between two parties efficiently and in a verifiable and permanent way such that they are secure by design and exemplify a distributed computing system that is reliable, secure and exhibit a high degree of fault tolerance. Distributed ledger technology is evolving and has only recently begun to establish itself in the various blockchain transactions, and such systems that are now developing have not found use in solutions to securitization needs.

Smart contracts provide an additional modality that allow for partial or full execution of the formal contractual relationship without human interaction. One of the main functions of a smart contract is to provide an automated escrow, that is a non-human interaction (or very minimal human interaction transaction) that enacts the exchange, receipt and/or disbursement by a third party of money or property for other contracting parties. The smart contract is a computer-based protocol that digitally facilitates the negotiation, performance, verification and/or management of contractual relationships. Unfortunately, in the past smart contracts have not fully overcome lingering security issues that are extant with digital transactions over networks, and particularly the Internet.

Smart meters are electronic devices that record and measure, for example, consumption of a metered asset, and communicate the information to a supplier of the asset for monitoring and billing. Smart meters can transmit this information continuously, or on set and modifiable schedules, and further enable two-way communication between the meter and a central system. Smart Meters are an advancement from analog meters and since the early 1970s have provided an advanced measurement mechanism, eventually utilizing digital technology to provide advanced functionality. Prior to the development of smart meters and smart metering technology, prior analog electrical and gas meters only were capable of measuring total consumption, providing no information of when the energy or other asset was consumed.

Today, smart meters provide a way of measuring this site-specific information, allowing provider companies to charge different prices or rates for consumption according to variable factors, such as the time of day and the season. This type of advanced metering infrastructure provides greater capabilities than less sophisticated automatic meter reading since it also enables two-way communication between the meter and the supplier.

Communications from the meter to the network may be wireless, or via fixed wired connections such as a power line carrier. Wireless communication options in common use include cellular communications (which can be expensive), Wi-Fi (readily available), wireless ad hoc networks over Wi-Fi, wireless mesh networks, low power long range wireless (LoRa), ZigBee (low power, low data rate wireless), and Wi-SUN (Smart Utility Networks).

While smart meters provide advanced and sophisticated methods of measuring and communicating asset consumption and use, they have not been employed to implement and administer and serve as the foundation of value attribution in securitized assets for the benefit of investors that have provided financing and capital to create the infrastructure for the assets. There exists a long-felt need in the art for systems that can provide seamless securitization of infrastructure creation and management for investors in a blockchain environment.

SUMMARY OF THE DISCLOSURE

The present disclosure teaches methods, systems and apparatus for using blockchain distributed ledgers to build and maintain infrastructure projects. The disclosed subject matter utilizes smart meters and smart contracts to increase information flow in the securitization of digital securities which are issued to fund and administer the infrastructure projects. This provides transparent and predictable returns to investors and efficient capital formation and infrastructure management to the digital security Issuers.

The disclosure will be best understood by reading the below Detailed Description in conjunction with the drawings, which are first described briefly below.

DETAILED DESCRIPTION

Figure 1:
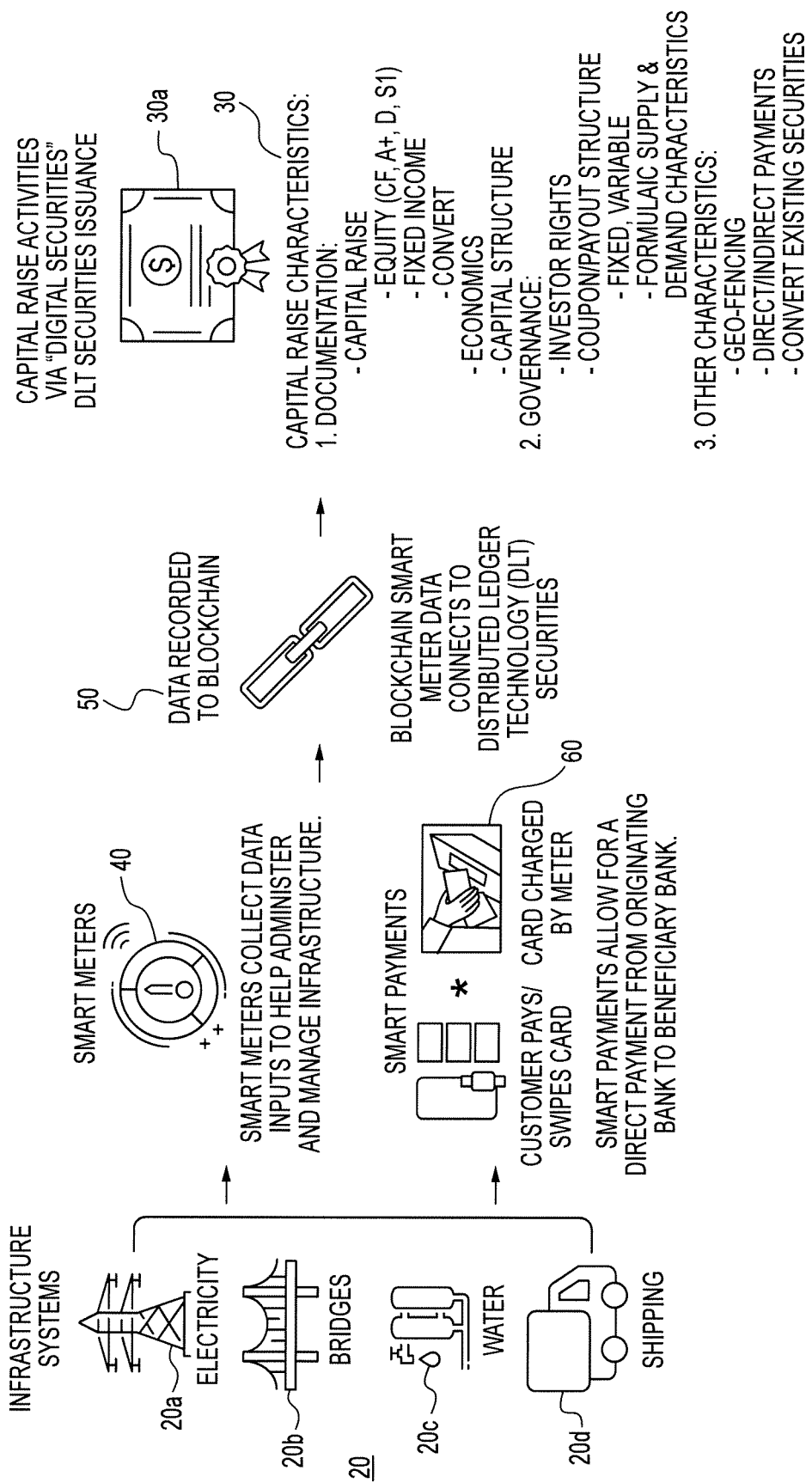
FIG. 1 is a block diagram of a smart meter issuance system for funding of infrastructure utilizing blockchain ledgers.

Referring to FIG. 1, an exemplary block diagram of a system for smart meter issuance (SMI) is shown at 10 to achieve digital securitization of infrastructure 20. Generally, any form of infrastructure system 20 that must be securitized, funded, and administered in accordance with the principles of the present disclosure. Non-limiting examples of such infrastructure are electrical power plants and projects 20*a*, bridges and transportation systems 20*b*, water purification, distribution, and purification facilities 20*c*, or shipping and storage facilities 20*d*, which may all be funded, administered, and managed. The SMI described herein provides capital formation where the digital security agreement 30*a* that governs the nature of the capital raise (for example, debt, equity or convertible securities, derivatives thereof, and as known by those with skill in the art carbon credits or other more exotic securities used to finance projects) is connected to smart meters that collect data inputs from the infrastructure systems 20. Based on revenue profiles derived by the issuer of the digital security agreement 30*a* in a digital security issuance platform 30, seamless and direct administration of the ownership of capital raised, indicative and actual yield, and payments to the investors can be performed and administered through blockchain recordation 50 of the data from smart meters 40, thereby eliminating the inefficient multiple layers and expensive processes that have existed in prior funding regimes, while providing greater visibility to investors and greater liquidity of the capital raise in the future for new investors or in secondary offerings.

Implementation of SMIs as described herein create new processes and solutions for infrastructure funding to increase efficiency, reduce network participants, and reduce capital formation and administration costs. Additionally, SMI systems can implement smart payments 60 from customers of infrastructure systems 20 through credit card swipe of readers or alternate payment mechanisms including NFC, wireless connectivity to smart meters 40 so that payments from customers can be made directly from customers banks to the beneficiary banks of the owners of the infrastructure systems 20. This provides for complete transparency of the financial performance of the infrastructure systems 20 so that investors can be advised of this performance by the blockchain mechanisms associated with the SMI 10. It will be clear to those of ordinary skill that the present disclosure teaches an efficient and straightforward administrative layer that provides a user permission framework for information flows. Because the smart contract maintains a real-time cap table, that cap table becomes one form of authorization of information from the asset. If an investor is on the cap table, the investor receives the information, and if you not, the investor does not receive it. This simplifies the API/data architecture requirement to take each asset that is out there and develop an API to sync information flows to all cap table holders for every asset. By using the present framework, information flow is expedited to all cap table holders as the source contract is the source of truth. Additional stakeholders, credit rating agencies and insurance companies can be added but that is much easier than a cap table that could have thousands of investors party to one asset.

The smart meters 40 include, but not are limited to smart meters in energy, water, transport, waste, broadband, or parking. The informational outputs of smart meters can be transmitted over a network, such as the Internet or other private or peer-to-peer networks as desired. It will also be appreciated that the architecture of the present systems and networks may be server-based, may run on individual computers and may be implemented by distributed systems and networks as is desired. The SMI 10 utilizes a variety of such smart meters 40 to pull in information from infrastructure systems 20 to determine the output metrics of infrastructure systems 20. The SMI 10 using smart meter solutions create a data pipeline of microservices that ingests various readings and produces data assets related to the infrastructure systems 20 that are useful to capital formation and management of the digital securities that have been created to fund the infrastructure systems 20. This information and data is then plugged into a web application and data analysis/administration layer designed to explore various aspects of the data to compare the data against smart securitization governance requirements and the economics of the particular industry in which the infrastructure systems 20 are located. These two parts are also connected via a REST API, or other connectivity means, that can be exposed to customers, allowing them to build their own applications on top of the smart meter data architecture. The Smart Meter layers create a non-invasive connection to devices that listen for data readings.

In the context of electrical infrastructure 20*a*, demand meters, fuel cells, solar panels, wind turbines, building management (BMS) systems and supply meters are all types of devices that can generate data useful to the blockchain management of the SMI. Once connected, the smart meters receive data readings as frequently as such devices emit the data and bundle the data for analysis by the SMI 10. Every reading is digitally signed, creating a secure audit trail for future validation. As data readings are streamed into the SMI 10 from devices, the SMI 10 also streams various data points from third party providers to add additional richness to the resulting data assets. This can be used to assist in future valuation and credit rating metrics associated with the energy infrastructure 20*a* under analysis and for which funding is required. By providing this kind of data richness, the credit worthiness of the energy infrastructure 20*a* is likely improved due to the availability of such information to investors and issuers. Metadata points for energy infrastructure 20*a* may also be provided and may include things like weather data, pricing data, grid load and grid emission factors. New data sources are added to the service regularly, further increasing the richness of the data asset. These metadata assets can also be used in a new form of research analysis to determine credit worthiness of energy infrastructure 20*a*, for example.

Distributed ledger technology has not heretofore been used in conjunction with smart contracts to achieve digital securitization for infrastructure projects which present unique challenges to the industry and investors to achieve the desired level of funding and oversight. Smart contracts allow data taking from a traditional database (DB), having either a single row or column of information, and then allow for carroting of information of referential relevance. A single hash can provide referential information on governance, cap table, and jurisdiction registration information. This single hash of relevant information is an electronic record that memorializes the attributes named above, in addition to others, and allows the single dimension of information and data to become both 2 and 3 dimensional. It has thus been realized that the use of smart contracts with distributed ledgers provides a unique opportunity to provide efficient cost-effective digital securitization not previously achievable in the past.

Further, coupling smart meters to the digital securitization regimes presented by this disclosure provides a unique and enhanced process of analysis and administration that allows for straight through processing of tasks that currently involve multiple parties and multiple hops. The disclosed methods and apparatus using data from smart meters creates a sophisticated and versatile layer of processing and analysis between the smart meters and the smart contracts. This unique administrative layer receives information and can readily process the inputs since the new administrative layer of the present disclosure defines the type of smart meter data assets that send the information, and the digital security layer defines the characteristics of the digital security, thereby providing efficient SMI operations.

Once the administrative layer defines both the types of assets on the smart meter and smart contract side of the SMI, the administrative layer is able to perform analysis on the incoming data in the context of the infrastructure to identify both rates of return for investors and to for processing of payments to the investors. An example of how the administrative layer of the SMI functions to implement these functions is in a Variable Interest Rate Product energy infrastructure 20*a*. In this context, an energy asset in infrastructure 20*a* produces power to be consumed by customers of infrastructure 20*a*. The energy asset that produces power has meters at the end of the energy production componentry. These meters can be both analog and smart meters and measure how much power is being produced and put onto the network. Consumers consume this power and pay varying rates based on supply and demand characteristics of power at various points of the day. Consumers pay for their power, and energy infrastructure 20*a* operates its power network by balancing supply and demand characteristics.

With this interaction between buyers (consumers) and sellers (infrastructure 20*a*) of power, infrastructure 20*a* also purchases additional power from other participants producing power connected to their network. A solar farm as one example of a distributed feature of energy production could be an independent asset added to a infrastructure 20*a*'s energy network and in this case, the infrastructure 20*a* buys power from a solar farm or other producers of energy such as a wind farm, waste or co-generation plant, or other energy producer. The solar farm will have a smart meter at the end of the solar farm to measure the output from the asset and provide that power to the infrastructure 20*a*. Infrastructure 20*a* is a party to a purchase agreement (PA) for the power with the solar farm operator. In a high energy demand setting, the infrastructure 20*a* will pay one rate, while in baseload demand settings, infrastructure 20*a* may pay a different rate. This mechanism is not limited to the two conditions of inputs and can reflect one or multiple inputs into the security. Since the present system efficiently handles aggregation of real-time cashflows to be modeled and reported to investors across a pool of assets and multiple inputs to the security, the real-time connection to smart meters and IoT devices disclosed herein provides a framework to aggregate variable economic performance outputs across multiple assets. This solves the asset bundling issue which in the past existed since there was not a solution that addressed variable revenue production scenarios. The prior systems simply were not able to achieve asset bundling and address variable economic performance due to the lack of systems and modalities that could aggregate real-time cashflows for modeling and reporting. The present disclosed systems thus provide a solution to this long-felt need which results in a lower cost of capital, and lower cost for administrative, reporting and trustee services.

By combining the smart meter and smart contract concepts of the present disclosure, the smart meter data assets can be input to the administrative layer, typically implemented by an Oracle Administration Assistant (Oracle is a registered trademark Oracle of Redwood City, CA), which is an analytics layer, and based on the capital table defined by the smart contract and the governance set in place by the Oracle layer and administrative layer, infrastructure 20*a* is able to create a unique output having the ability to provide a variable interest rate yield to smart contract holders or real time representation of the return that investors will receive. This allows for capital formation and project finance participants to have a real-time representation of infrastructure 20*a*'s return. This further allows for the reduction of multiple components of administration currently in place.

Another example of the use of the concepts of the present disclosure is in project finance and management of a system. Such an SMI is, for example, found in a straight-line payment processing infrastructure such as infrastructure 20*b* wherein a bridge may be financed and managed. In the context of infrastructure 20*b*, an entity such as a private company, public municipality or public authority determines that it needs to build a bridge. The bridge requires $100 mm in capital to be built. Capital is raised into a security or a smart contract. In the case of the smart meter data production and acquisition in this instance, a payment toll (whether cash register or wireless sensor) consumes information and sends this information to Oracle/administrative and analysis layer, and based on the processing and analysis of that data, is able to automatically route payments and provide a return or yield to investors on a near real-time or actual real-time basis. This eliminates the need for administrators and trustees.

In defining the administrative layer, the project managers or investment bankers would forecast how many cars will cross the bridge, what the toll will be and, based on the model or other defined characteristics in the administrative layer of the smart contract or smart meter analysis layer, the smart contract has the rules to define what portion of the tolls of should go back to investors and what should go to operators. Investors always want their money back and this does it on a real-time basis. The SMI could use stablecoins or other forms of crypto currency as the mechanism of payment, thus providing benefits relating to the reduction of processing fees and the ability to track payments more efficiently.

The benefits for this use of an SMI arises with the combination of smart meters and securitization such that a mechanism is created that implements straight through processing (STP) of information/payments. Based on the administrative layer defined by the Oracle analytics and smart contract, the SMI can determine and route information and payments on a near real-time basis to holders of securities. This eliminates the need to engage a trustees-function of infrastructure 20b to manage the payments, and greatly reduces overall administration complexities of infrastructure 20b. This also concomitantly reduces potential opportunities for corruption as the money is taken off the revenue and no other hands can get at it before going to investors.

The data generated from this process allows for faster infrastructure valuation and creates a tradeable asset based on the cash flows and the net asset value (NAV) of infrastructure 20b that can be re-rated as necessary at near real-time basis. The data can be used to fine tune risk models for credit rating of asset-backed assets. It would allow previously untradeable private assets to be traded and as a result increase and improve liquidity characteristics and the classification of the asset under the Basel III protocols (Basel III is an international regulatory accord that introduced a set of reforms designed to improve the regulation, supervision and risk management within the banking sector).

As with all of the examples of an SMI of the present disclosure, ongoing use and maintenance of the infrastructure can be implemented with the smart meter and smart contract modalities and functions. With the infrastructure in place after the initial financing and build-out, the system for ongoing use and maintenance is maintained post capital raise. This process can also be applied to existing assets to facilitate securitization of existing assets using the same methodology. The concepts of the present disclosure can provide the same benefits either for new issuance or existing assets. Thus, information from the smart meters can trigger the creation of a new security, issuance or digital asset when, for example, the asset has achieved a goal, performance level, predetermined level or other criteria defined in the offering document and monitored by the smart meters and managed by the SMI. The data associated with the triggering event will be stapled to the new asset as proof of work and creation. For example, in the context of electrical infrastructure mentioned above like a solar farm producing renewable power, once that farm has achieved a certain amount of power, based on a conversion table, it will trigger the creation of a renewable energy asset on chain.

The securities issuance platform of the disclosure provides clients with a web-based ecosystem built on blockchain protocol, HTML5 and other front-end interfaces with API and Financial eXchange Protocol (FIX) access connections, a multi signature-wallet system, as well as the ability to process and streamline digital securities issuances. To process and streamline issuances, the system provides two modules. The first is an SAAS module, which provides a solution for management teams preliminary to issuance to provide information reflecting control members of the registering entity or company building the infrastructure 20, and to provide Anti-Money Laundering (AML), Anti-Terrorist Financing (ATF), and Know Your Customer (KYC), often times referred to as AML/KYC, entered for all members. The management team, Board of Directors and any person or entity that owns more than 10% of the company goes through a Personal Declaration process and is approved with a Notice of No Objection from the relevant business management association (BMA), and the company is formed.

Typically, the company has either engaged with a corporate service provider (CSP) before submitting information to the platform or previously registered their company such that management of the issuer and its CSP has since provided the necessary information for the Corporate Registration to be processed. The company's digital asset submission is delivered to the FinTech Advisory Committee (FTAC) and the Registrar of Companies of the jurisdiction, which is typically under the auspices of the Ministry of Finance of that jurisdiction. Upon approval of the FTAC submission, the information from the submissions of the Personal Declarations, Corporate Registration and Digital Asset Submission all contribute in part to the Issuance Portal as described below. This process specific to Bermuda does not limit the jurisdictional reach of the SMI process.

Figure 2:
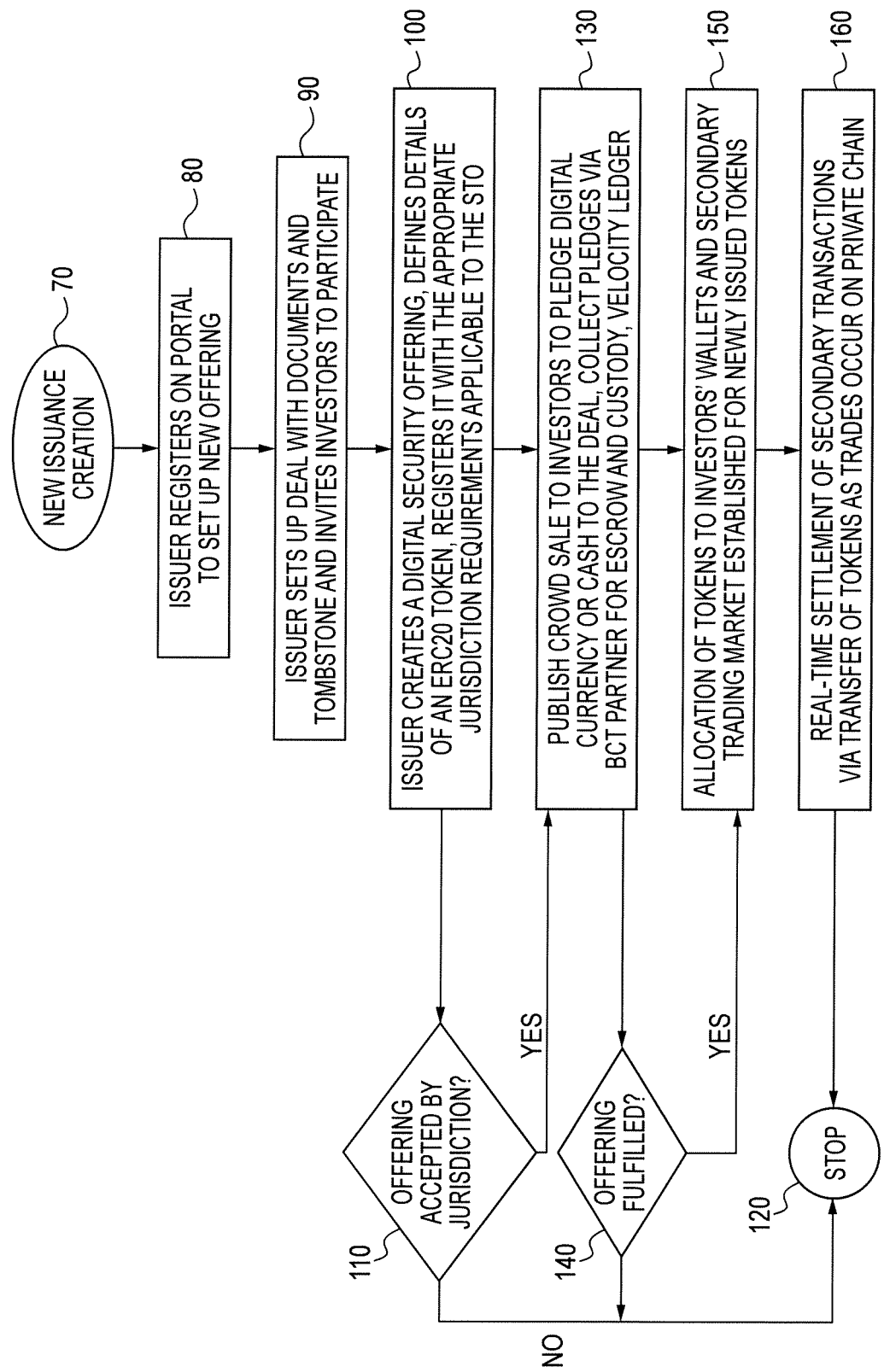
FIG. 2 is a flow diagram of new issuance creation and management utilizing blockchain ledgers in conjunction with smart contracts and smart meters.

Once the Registration process of the first SAAS module for the company is complete and the Digital Asset Submission is approved, the digital security issuance platform 30 is the second module of the disclosure that provides an Issuance portal that allows the Issuer to offer the securities to investors. Referring now to FIG. 2, new Issuance creation begins at step 70 and at step 80, the Issuer registers on the portal to set up the new offering to investors. At step 90, the Issuer sets up the issuing deal with the appropriate documents and publishes a tombstone to provide notice of the deal. Investors are also invited to participate in the deal as is desired by the Issuer.

The offering process will be described herein with respect to the use of a digital security offering funded by investors by fiat or cryptocurrencies based on blockchain tokens which can be bought, sold, or traded. Such a token, which currently is a cryptocurrency, is the Ethereum token (ETH) which is widely used in the cryptocurrency exchange markets, however the disclosure is not limited to ETH. In this case, tokens or digital securities represent a diverse range of digital assets, such as vouchers, IOUs, or even real-world, tangible objects. In this way, tokens are essentially smart contracts that make use of the blockchain environment. Preferably, the tokens are based on Ethereum Request for Comments 20 (ERC20) standard protocol, wherein the number "20" is the twentieth version of the protocol. ERC20 has emerged as the technical standard used for all smart contracts on the Ethereum blockchain for token implementation. It will be appreciated by those skilled in the art that the ERC20 token is only an example of the type of digital currency that can be used by the present portal, and that others such as Bitcoin, Ripple, Ether, XRP, Libra, Monero, and others. Moreover, standard currencies issued by world governments are also usable with the described offerings, for example the United States Dollar, Eurodollar, British Pound, Japanese Yen, Chinese Yuan, Korean Won, and others.

At step 100, the Issuance portal is utilized by the issuer to create the digital security offering by defining the specific details of the ECR20 token and then registering the ECR20 with the appropriate jurisdictional authority that regulates security token offerings (SFO) for the jurisdiction. It is then determined by the STO if the ECR20 token is accepted and this decision is communicated back through the Issuance portal to the Issuer and if the offering has not been accepted at step 100, then the current registration process is stopped at step 120 until the Issuer can provide any required remedial actions to the STO.

If the token has been accepted, then at step 130 the Issuance portal publishes the offering in a crowd sale scenario to investors asking the investors to pledge the ECR20 or equivalent cash to the deal. The Issuance portal then facilitates pledge collections through the entities that run the portal using appropriate escrow and custody modalities, and a ledger is started and maintained to record the investors' equity stake in the infrastructure 20. At step 140, the Issuance portal, through the use of the maintained ledger, determines whether the offering has been adequately fulfilled in accordance with the terms of the deal and the registration documents. If the offering has not been adequately fulfilled, then the offering is stopped at 120 so that the Issuer and owners of the infrastructure can take whatever remedial action is necessary to ensure that the offering can be adequately completed.

If the offering has been fulfilled at 140, at step 150 the Issuance portal undertakes allocation of the tokens to the investors' electronic wallets that will have been created and administered by the Issuance portal, to be discussed in more detail hereinafter. The Issuance portal may also establish a secondary trading market at 150 for any newly issued tokens as permitted by the registration's parameters. Real-time settlement of secondary transaction is undertaken by the Issuance portal at step 160 through transfer of the tokens as trading of the tokens is undertaken in the market. Having completed initial offering, the Issuance portal ends the offering process at 120.

The Issuance portal supports such protocols as ETH, with BTC, LTC, EOS and XLM. The platform will allow participants to deposit or withdraw tokens to/from the associated public blockchains. The Issuance portal is accessible under the Digital Asset Issuer role. The Digital Asset Issuer uses the 'New Offering' process and uses a deal creation wizard. The New Offering Wizard provides details on the deal's specifics, access to a link to important files, any regulatory items that should be highlighted or reflected, and Escrow and Wallet details for both investors and issuers. The Issuance portal also provides tools for the Issuer to manage how the Offering is delivered to investors. The system allows the Issuer to define the type of Offering and Risk profile of the investor—Crowd Funded, Accredited, News, Method to contact management, access to FAQs and Management Team.

The various steps of FIG. 2 contain significant details and activities that are managed and implemented by the Issuance portal. While the steps of FIG. 2 may be distributed amongst various User Interface (UI) screens and activities, it will be appreciated that the details of such UI screens and activities are achievable in accordance with the following description.

Figure 3:
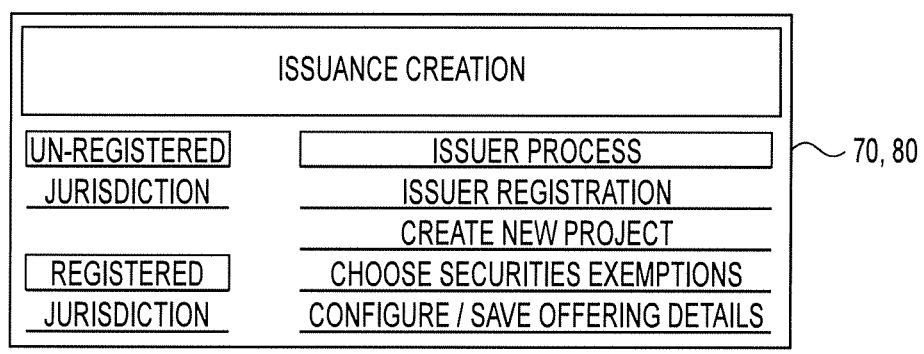
FIG. 3 is a user interface (process inputs) of an issuance portal used in conjunction with the issuance creation.

Referring to FIG. 3, the Issuer identifies at an issuance creation UI the key components of the issuance 70, 80. Such key components are, for example, the relevant registered and un-registered jurisdictions where the issuance will occur. Additionally, the Issuer process is specified and may include the Issuer registration, the creation of a new project, the choice of securities exemptions, and the configuration and saving of the new offering details.

Figure 4:
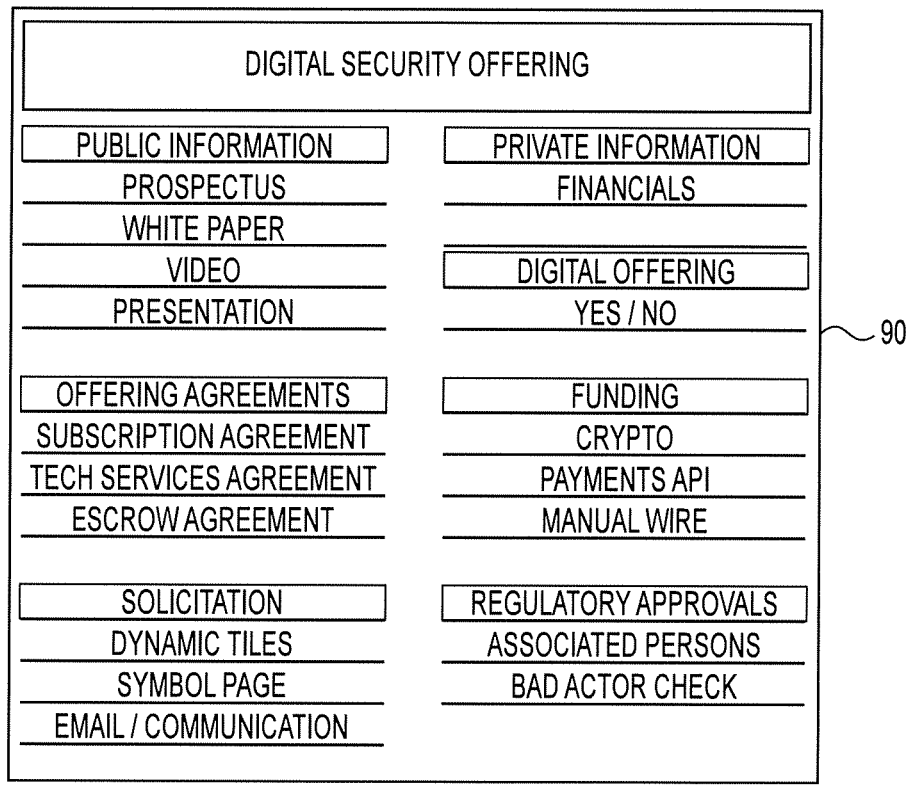
FIG. 4 is a user requirements screen of an issuance portal for setting up the parameters of the digital security and offering.

In FIG. 4, the digital security offering steps 90 are set forth on the Issuance portal UI wherein the Issuer will submit and file for the issuance. As mentioned above, in many cases this information will already have been codified in the system as the issuer may have submitted the information during the Digital Asset Registration process. In some fashion, the information relating to the prospectus, white papers, videos, presentations, and any other public information will be submitted. Additionally, private information such as financial information will be submitted to the Issuance portal. It will be determined whether the offering is a digital offering at this point also. The offering agreements, such as subscriptions agreements, technical services agreements and escrow agreement must be submitted, as well as information related to funding, for example, cryptocurrency. The payments API and manual wires will also be submitted. The Issuer must also submit solicitation materials such as dynamic tiles, symbols and email or other communications, Regulatory approvals relating to associated persons and bad actor checks will also be provided.

Once the issuance is released to the public upon the FTAC approval, this issuance and other issuances will be on the platform and can be reviewed and compared based on sector, type of offering, jurisdiction, amount of capital being raised, number of units available, and other deal attributes.

The system provides tools to create the symbol for the issuance. The Issuer defines the symbol's attributes such as decimalization, trading type, symbol type and market characteristics. Issuers will receive an ERC20token generated directly from the platform to the public Ethereum blockchain (whether on test net or live net). The issuer can define attributes and parameters such as the name, symbol, quantity, and can add a list of wallets to a white list which lists an eligible and approved wallet/address.

Figure 5:
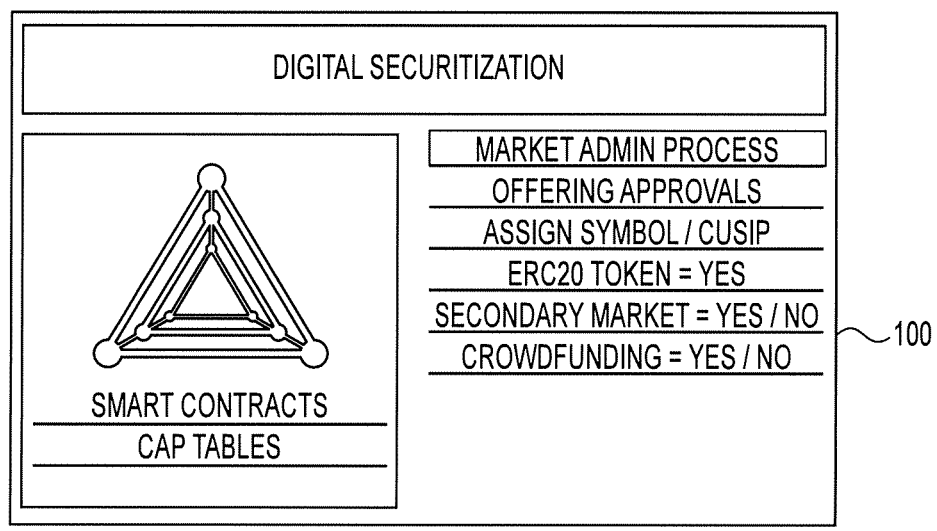
FIG. 5 is a user inputs screen of an issuance portal that manages the administrative processes required to obtain approval for an issuance and a digital security offering.

FIG. 5 sets forth the actions taken to achieve digital securitization 100 which includes the creation and management of the smart contracts and the creation of the relevant cap tables. Additionally, the market administration process will be set forth to capture the necessary offering approvals and the assignment of the approved CUSIP numbers and symbols or the securities. At this point, the Issuer will have decided whether the ECR20 token (or some other digital currency) is to be used and will provide this information to the Issuance portal. Also, to be provided at this UI screen is whether the use of secondary markets is permitted and whether crowdfunding is an allowed funding modality.

Once the Issuance is listed, investors will have the ability to see the deals on the platform and can request information and access for the listings page, or they can receive a link for registration into the platform via direct link to the offering from the Issuer or a member of the Selling Group. Once investors are registered and have passed AML/KYC, which may be administered by the Issuance portal and the third-party processor Identity Minds, the investor can create a new custody wallet on the system. Once the wallet is in place for the investor, the investor can follow one of three processes below to commit funds to the issuance. The issuer can monitor details such as accreditation, links to bank account information and wallets for custody. The issuer receives all the indications and once the book has been built, the Issuer will allocate tokens and make the issuance effective for release.

Figure 6:
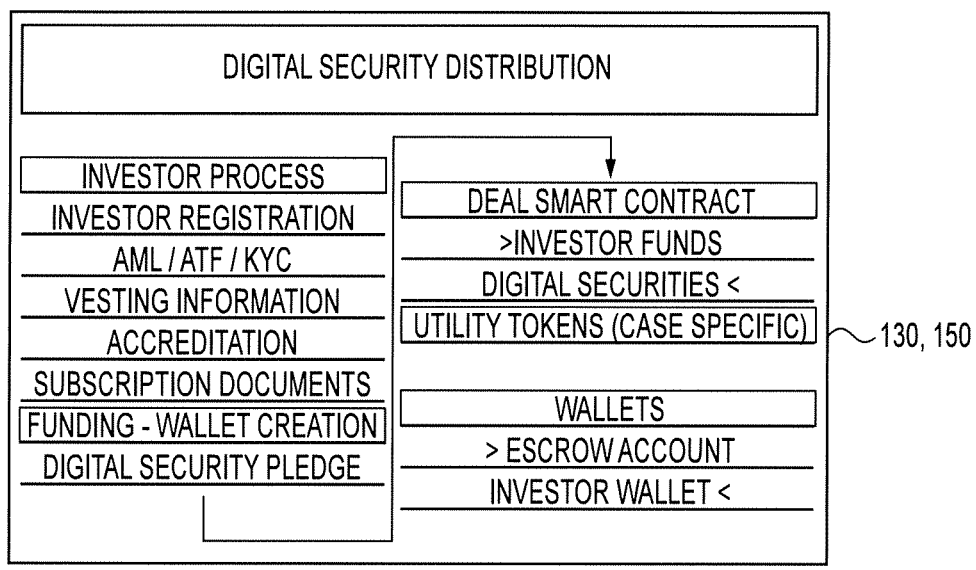
FIG. 6 is a user interface of an issuance portal setting forth the distribution process of issued digital securities to investors.

Referring to FIG. 6, at this UI screen of the Issuance portal the issuer will identify key characteristics for investor processing 130, 150 with escrow and wallet custody to set forth the parameters of the digital security distribution in the market. The digital security distribution of this aspect of the Issuance portal includes input of investor processes, for example, the investor registration, the AML/ATF/KYC requirements of the jurisdictions, vesting information, accreditations, the subscription documents, the requirements regarding the creation and funding of the investors' wallets, and the digital security pledges required by the offering. The offering deal smart contract parameters will also be input including the amounts of the investors' funds, the digital securities to be used in the offering, and the specific utility tokens to be used in the offering. The investor wallet information will include the amounts of the escrow accounts to be held in the wallets.

Upon passing AML/KYC reviews during steps 130, 150, and in order to allow the investors to deposit money, an escrow processing and funds custody workflow is defined and enacted by the Issuance portal. The first action taken to implement the escrow processing funds custody activity is to issue to each investor an electronic wallet on the private blockchain established by the Issuance portal, and a mirrored public network wallet (on supported blockchain protocols including Ethereum, Bitcoin, Stellar, Litecoin, etc.) controlled by the private blockchain's custody protocol. The public wallets are controlled by the private blockchain's custody system and cannot be withdrawn without moving through the private blockchain's multi-signature governance process. Tokens on the internal blockchain's private network can be moved between the private blockchain's participant wallets on both primary and secondary markets without execution costs, thus resulting in private market transfers.

Custody services for the offering are required and can be provided by appropriate vendors skilled in such services. Such services are designed to ensure that all exchange customers are on-boarded securely and that funds in custody are always safe from potentially malicious actors. This enables creation of public and private wallets and can be configured to manage tokens on a per user or exchange level basis. When participants deposit tokens, those tokens are transferred to cold storage wallets on the public network. The platform credits the user's wallet on the private blockchain with representative proxy tokens that can be traded on the platform. The system has a settlement window when the market is brought offline and token transfers are authorized using a password and private keys with an additional multi-factor Zortag authorization process. At the end of the settlement window all trade activity is reflected on the public network and the market is brought back online for trading.

The private blockchain's custody system is a network of segregated public network wallets, which are wallets on public blockchain. For the settlement process, when the market is proactively brought down to facilitate settlement which occurs at the end of the day, the private blockchain performs public network transfers to bring these segregated public wallet balances in sync with private wallet balances that have been transacted since the last settlement window.

In accordance with the Issuance portal and SMI described herein, a SYSTEM WALLET is the main electronic wallet to which all deposit and withdrawal actions settle during the settlement window time period. Outside of the settlement window, this wallet maintains a negligible balance to ensure safety of exchange funds. The COLD WALLET is each investor's offline electronic wallet which stores the investor's resources in cold storage at all times outside of the settlement window. The balance in this wallet is only updated during the market operator specified settlement window time period. The HOT WALLET is the electronic wallet that gives the investor's their entry point into the market. All deposits will be sent to this wallet at which point they will be credited to the investors on the blockchain, and then pushed to cold storage.

To enact the escrow processing and custody activities of the Issuance portal, a workflow is performed which begins with each investor registering on the platform to receive an internal wallet. The investor then deposits resources (Bitcoin, Litecoin, Ethereum, etc.) to use on the platform, which can be accomplished using escrow or bank wire services known in the art, or by connecting with an API Payment service provider such as Dwolla or Stripe. The investor then engages an entry point UI screen shown in FIG. 6, which is provided by the Issuance portal as an interactive screen available to investors and designed for the specific needs of the issuer and selects one of deposit processes mentioned above.

The Issuance portal and its associated platform then creates the HOT WALLET that is unique to the investor and is controlled by the platform. The HOT WALLET is encrypted, and a key and/or password is created to be used automatically inside the platform. The investor then deposits the appropriate funds from their personal account to the HOT WALLET. A public chain fee is deducted. The investor then engages a function "Check HOT WALLET balance" function in the UI or through the REST API, and the platform checks the HOT WALLET Balance and transfer resources net of public chain fee to the COLD WALLET. In the case where the platform has been instructed to perform in a segregated configuration, 100% of the resources received due to investor deposits are transferred from the HOT WALLET to the COLD WALLET.

When the system is in segregated configuration mode, the investor deposits, for example, 20 ETH to the HOT WALLET. The platform then creates the COLD WALLET and gives the security keys and/or passwords to the appropriate parties, for example investors, security person and the system itself. The 20 ETH is then transferred from the HOT WALLET to the COLD WALLET net any of public transaction fees deducted from the transaction so ~19.99999 ETH will be tokenized in the internal balance and the internal balance is synced with the COLD WALLET 19.99999 ETH.

It is then possible for the investor to trade inside the platform and system. In the example of such trading the investor could finish a trade with 24 ETH. By the end of the day (or some other time frame if settlement is desired by the investor and system to be tracked in this fashion, for example, weekly or monthly), the system syncs the balance for Public COLD WALLETS with the network of investors' internal network balances that now exist as a result of the trading activities. To achieve this result, the system withdraws the funds from the other investors who in the aggregate lost the 4 ETH and deposits these funds to the winning investor's COLD WALLET so that the COLD WALLET's balance of winning investor will now be 23.99999 ETH, which will be synced with the internal balance of the system. After this synchronization process, the investor will then be able to trade inside the system during the next settlement period (in this example, tomorrow), or to request a withdrawal to their public network wallet after having the appropriate public transaction fee deducted from their balance.

Figure 7:
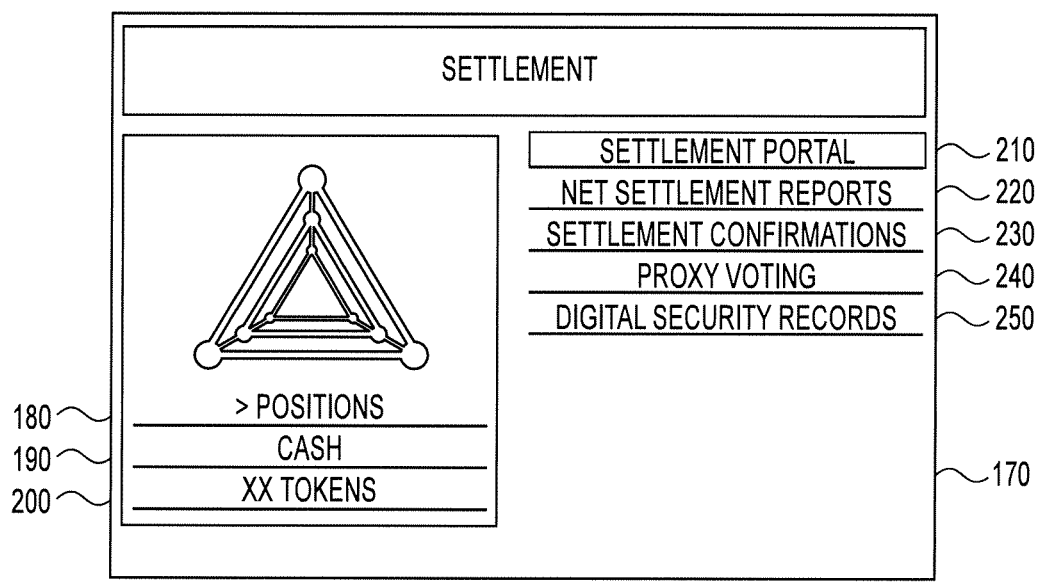
FIG. 7 is a user interface of a settlement portal which allows investor funds to be forwarded to an Issuer of an infrastructure project.

Referring to FIG. 7, a UI screen 170 allows the investor to track the trading activities set forth above. The UI screen 170 shows the net positions 180 that the investor holds, as well as the cash 190 available in the investor's COLD WALLET and the tokens 200 that are available therein. The settlement portal 210 can be entered through the UI screen 170. Additionally, net settlement reports 220, settlement confirmations 230, proxy voting documents 240 and digital security records 250 are all accessible to the investor thorough UI screen 170. It will be appreciated that UI screens such as those shown in FIG. 7 are customized and customizable for the particular issuers that have engaged the Issuance portal designers to provide the desired interface to the portal that the issuers desire. The UI screen of FIG. 7, and all other UI screens of the Issuance portal of this disclosure, may be designed to achieve the desired benefits and functionality that the issuer decides is required for issuance within the legal and regulatory requirements of the issuance. The present Issuance portals are thus flexible, highly functional and satisfy the needs of a wide range of issuers.

Once the custody wallet is created, the investor can receive its tokenized security from the issuer. Sending money to the issuer and receiving the tokenized security can be accomplished by there are three preferred approaches to satisfy delivery. The first is the traditional delivery mode wherein an investor can wire fiat money (legal tender whose value is backed by the government that issued it) to the issuer's attorney's escrow account, and upon confirmation of its receipt and verification of the transfer of these funds, the investor will receive the appropriate security representation. In this mode, the issuer will identify an escrow bank account and provide issuance and bank instructions. The investor completes the appropriate form provided by the issuer and the capital is wired based on the information of the wire. The issuer will see the information from the banks and use the portal to credit cash to the investor.

In a second mode of delivery, the investor can move stablecoins or cryptocurrency into their custody account for settlement of the issuance, and the issuer will sell the digital currency to fund operations. In a third mode, the operator of the Issuance portal facilitates cash processing through a third-party API such as Dwolla or Stripe.

Figure 8:
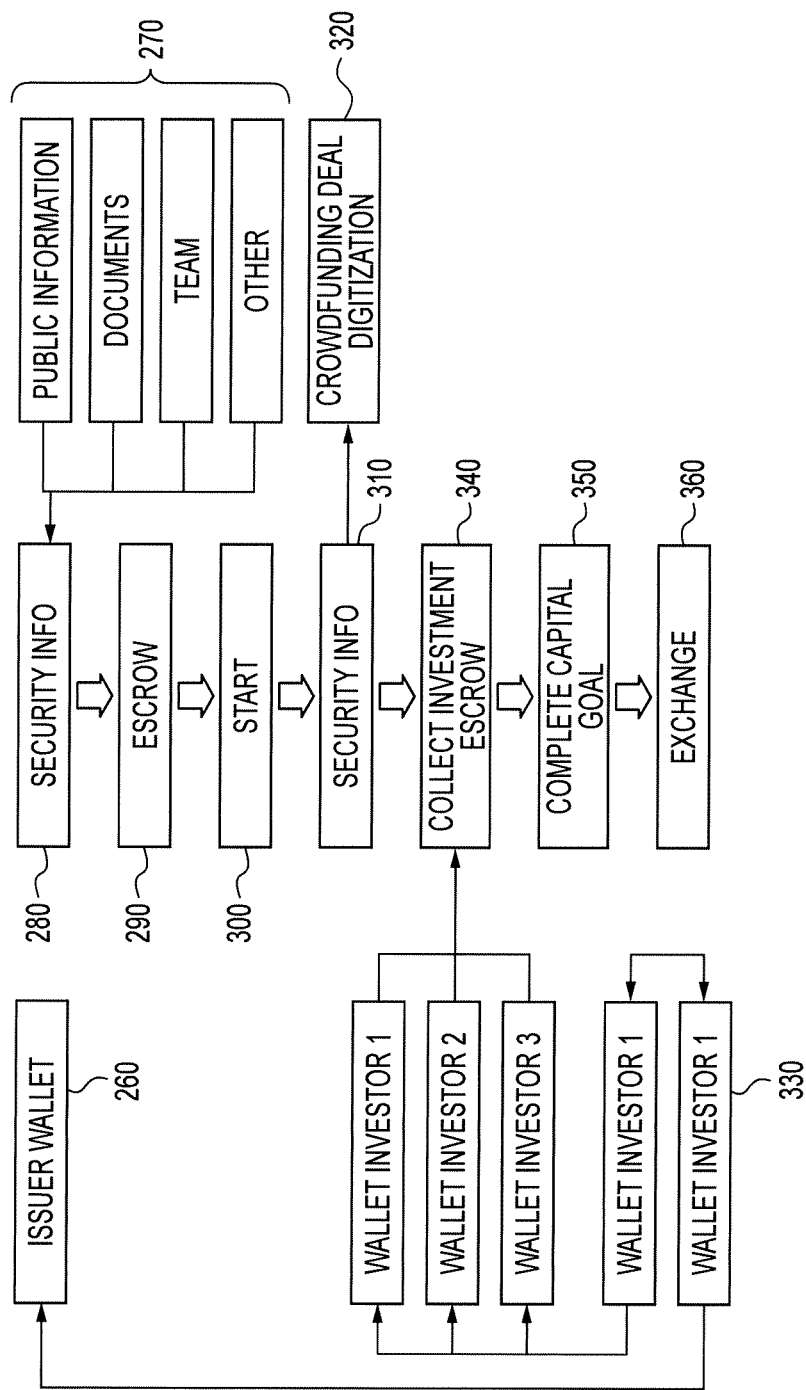
FIG. 8 is block diagram of a system of token issuance to investors and funding of an issuer wallet to fund infrastructure.

Upon achieving the desired capital raise threshold, the issuer can issue the token and the respective allotment of securities will be transferred to investors' wallets. Capital sits in escrow for the defined duration of the offering or is returned. Referring to FIG. 8, a block diagram of a preferred token issuance of this disclosure is illustrated. The ultimate goal of the token issuance process as managed by the Issuance portal is the funding of the issuer's wallet at 260. In order to achieve that goal, the information 270, as discussed above, is provided to the portal through a security information screen 280. As noted, the information 270 comprises public information, deal documents, team member information and any other relevant information as needed.

The input security information 280 is combined with the escrow information 290 and at 300 the issuance process is started by entering all of this material and data to as security info database which is part of the distributed ledger. If crowdfunding is to be part of the issuance process, then the database 310 shares this information with service 320 that digitizes the crowdfunding portion of the deal.

The investor wallets 330 are established by the portal as discussed above and the information related to the wallets 330 are provided to another database 340 which collects the investment escrow information about the wallets and the investors. It will be appreciated that the various databases of the system may be discreet, or part of a large, partitioned database. The escrow information in database 340 is shared with another database 350 that collates, tracks, and helps in managing complete capital goal raise. The complete capital goal raise is shared with the relevant exchange 360 in the applicable jurisdiction. When the capital goal has been completed, the investor wallets 330 are interfaced to the issuer wallet 260 and the issuance is completed.

The Issuance portal gives issuer clients the ability to use a distributed ledger for decentralized secondary market trading. One commercially available distributed ledger is available from the Velocity Ledger Group Exchange, Bermuda (VL) for decentralized secondary market trading, but other distributed ledgers are also usable in conjunction with the systems of the present disclosure. An advantage of VL's exchange is that it does not rely on a third-party service to hold the customer's funds. Instead, trades occur directly between users (peer to peer) through an automated trade and settle process. The VL system creates proxy tokens that represent fiat or digital currency or other assets, and through a decentralized multi-signature wallet escrow system, allowing firms or users to settle directly when they swap tokens on the system. VL's established trading platform will deliver a real-time, blockchain-enabled trading technology for investment tokens, security tokens, OTC digital currency, illiquid real estate and to regulated participants in a manner designed to promote liquidity, capital growth and security.

The Issuance portal and associated platform functionality provides real-time price aggregation across market centers and market makers as well as a private Central Limit Order Book (CLOB) delivering an automated method to match buyers and sellers of a tradeable asset. Traditionally, these are centralized and combined with order execution, which allows orders to be created, executed, and canceled at a central source with pre-defined priority rules. Following the spirit of decentralization, VL's order book system has been redesigned for blockchain deployment allowing CLOBs to connect and share electronic pricing and order records across the private blockchain.

Figure 9:
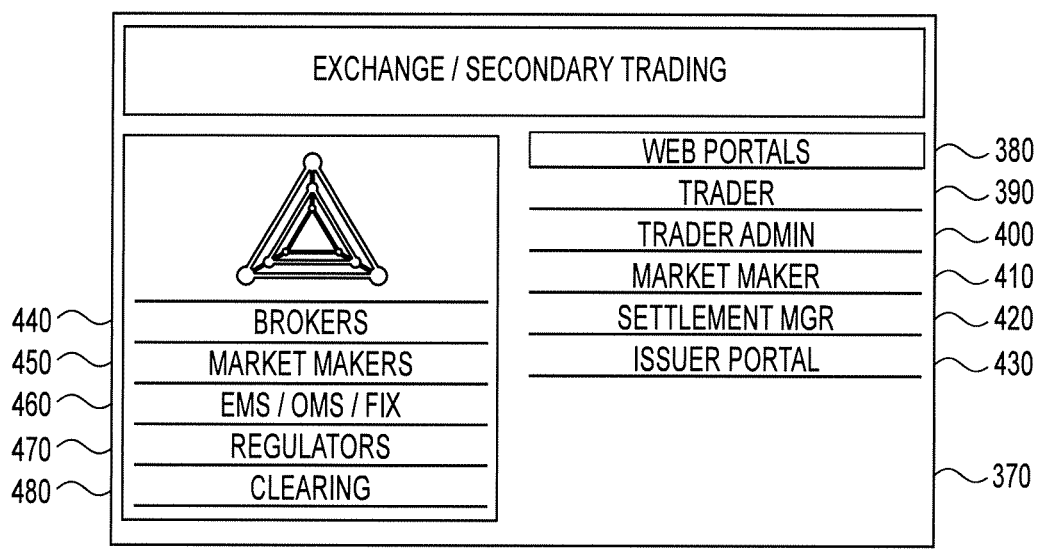
FIG. 9 is a user interface of a portal for trading in an exchange and secondary market.

Referring to FIG. 9, a UI screen of the Issuance portal to implement exchange and secondary trading is provided to implement secondary trading by CLOBs. This UI screen provides access to several web portals 380 on the right side of the screen to give complete availability to the necessary parties and functions for secondary and exchange trading. For, example individual traders 390 and trader administration entities 400 are accessed here. Market makers 410 and settlement managers 420 are given access, and the Issuer portal itself may be given access and be accessed at 430 as well. Actual brokers 440 and market makers 450 for exchanges are reachable on the left side of the screen, as well as order management systems (OMS), execution management systems (EMS) using FIX 460. Regulators 470 and clearing houses 480 are also accessible. This portal access allows the private matching engines operated by regulated entities, which is a centralized core process that manages orders, to determine if there are any crossing opportunities and then executes trades. The secondary market matching algorithm is based on price/time priority criteria for crossing. An inside price represents the best bid price and the best offer price from the orders. The orders in the order book are used to publish displayed orders on the trading portal.

Figure 10:
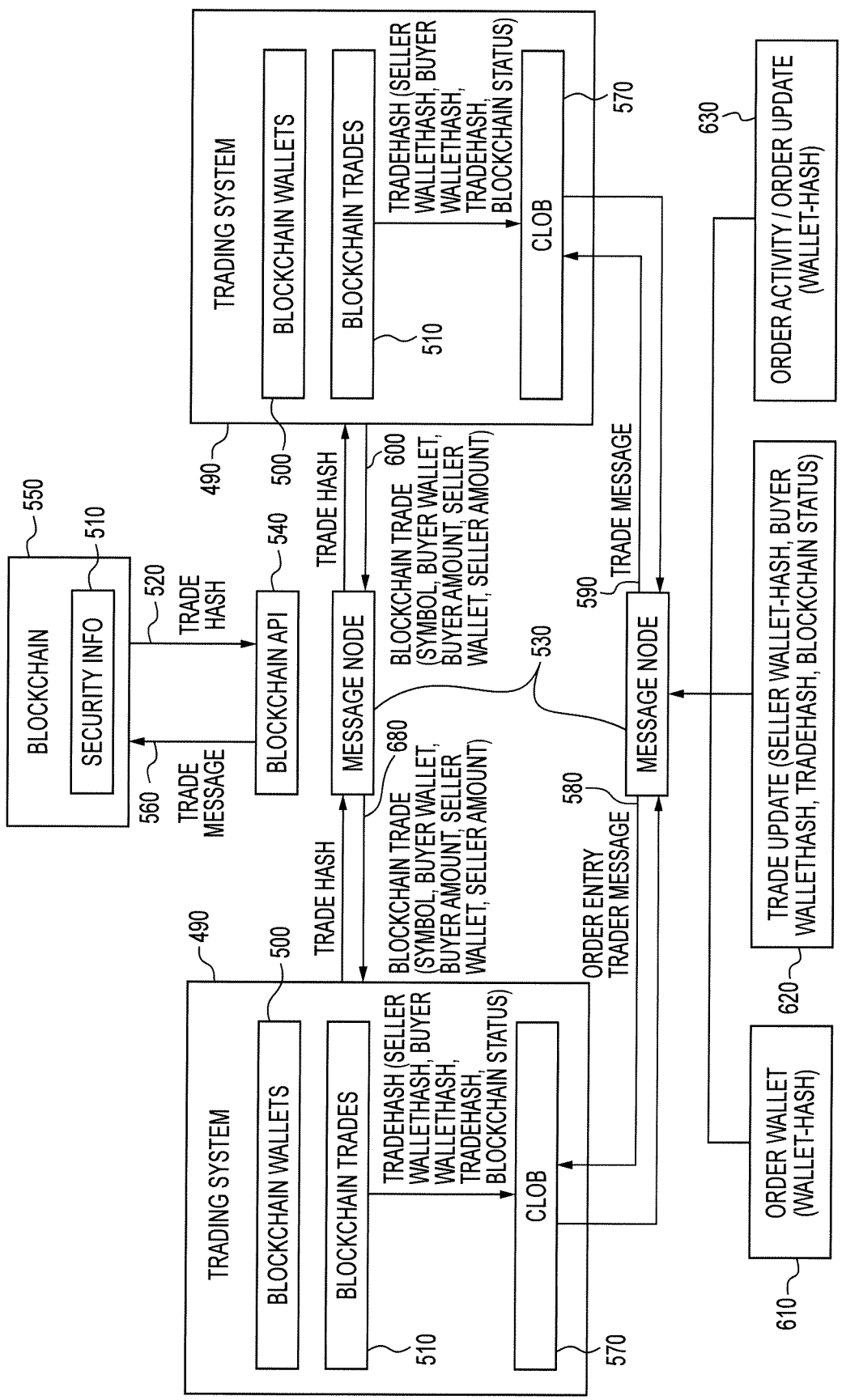
FIG. 10 is block diagram of a system for managing orders across multiple trading platforms in a blockchain environment.

Referring to FIG. 10, the blockchain system can manage orders across multiple trading systems 490 utilizing the hash messages described above. The trading systems 490 comprise the blockchain wallet information in databases 500. Blockchain trades 510 are placed and a trade hash 520 is generated which along with hashes related to the security buyer and seller wallets and information related to the blockchain status, are communicated to a message node which is in communication with the blockchain API 540 that communicates this information to the portal 550 in a trade message 560 The CLOB 570 of the trading systems matches the buyers and sellers in the trading systems 490 generating order entry tracker messages 580 and trade messages 590 which are exchanged between the trading systems 490 and ultimately provided to the portal 550 for settlement. The message node 530 will also receive hash data relating to order wallets 600, trade updates 620 related to the seller wallet, buyer wallet and blockchain status, as well as order activity/order updates 640. The security information database 310 communicates the trade hash 490 to the blockchain API 540 to keep track of the trade results for settlement in the secondary market.

In this fashion, orders in the secondary markets will be centralized, resulting in multiple benefits for investors and issuers alike, including increased liquidity and transparency (eliminating "stranded paper" where liquidity was a previously a problem for the security) as well as competitive bid/ask spreads. Moreover, use of the trading portals described herein reduces the costs of trading and settlement. The portal also reduces the complexity of mark-to-market thereby increasing valuations.

The disclosed platforms provide investors and issuers with established trading functionality, including real-time trading data, more accurate risk management tools, efficient blotters to manage orders, and better access to historical trading activity. The trading portals of the disclosure will support a wide range of profitability tracking and margin features for active traders and hedge funds.

As will be appreciated by those skilled in the art, the systems, apparatus and methods described herein can be implemented in hardware, software or firmware, or combinations of these modalities, in order to provide flexibility for various environments as discussed throughout this disclosure. Application specific integrated circuits (ASICs), programmable array logic circuits, discrete semiconductor circuits, processors configured to perform inventive functions, and programmable digital signal processing circuits, computer readable media, transitory or non-transitory, among others, may all be utilized to implement the present invention. These are all non-limiting examples of possible implementations of the several preferred embodiments of the present principles, and it will be appreciated by those skilled in the art that other embodiments may be feasible.

There have thus been described certain preferred embodiments of securitization of distributed ledgers utilizing smart meter. While preferred embodiments have been described and disclosed, it will be appreciated by those with skill in the art that modifications are within the true spirit and scope of the described principles.

What is claimed is:

1. Method of digital securitization of an infrastructure project that produces an asset, comprising:
   connecting to the infrastructure project a smart meter which gathers and ingests data from the infrastructure project to create readings made by the smart meter and to monitor the data related to performance of the infrastructure project to further produce data assets that are related to particular administrative uses required by the infrastructure project, the data assets being created on a continuous, scheduled or modifiable basis;
   recording on a distributed ledger the data assets, wherein the distributed ledger has further recorded thereon deal information regarding infrastructure funding documents, funding escrow information, investor security information, security exchange information, and funding distribution information, wherein the distributed ledger is further started and maintained to record investors' equity stakes or stakeholder reporting for the infrastructure project and wherein the distributed ledger is further adapted to provide for decentralized secondary market trading of a digital security offering used to securitize the infrastructure project;
   forwarding the data set to an issuance portal that administers creation of the digital security offering that will be issued to investors and that is used to securitize the infrastructure project, wherein the issuance portal further determines in conjunction with the data on the distributed ledger that the digital security offering has been adequately fulfilled in accordance with offering requirements and the infrastructure funding documents and the issuance portal uses the distributed ledger to provide to clients of an issuer ability to engage in the secondary market trading of the digital security offering;
   analyzing by the issuer through a user interface to the issuance portal a set of securitization requirements defined by the issuer of the digital security offering in conjunction with the data set on the distributed ledger and the data on the distributed ledger regarding infrastructure funding documents, funding escrow information, investor security information, security exchange information, and funding distribution information to create a listing of the digital security offering that complies with jurisdictional requirements of the jurisdictions in which the digital security offering will be issued;
   creating unique investor digital, electronic wallets on a blockchain established by the issuance portal for investors that are passed to invest in the digital security to be issued in accordance with the digital security offering by accessing a security information screen on the user interface to access the distributed ledger containing the deal information and issuing the wallets on a private blockchain established by the issuance portal, wherein the electronic wallets provide to the investors the ability to engage in processes that allow the investors to commit funds to the issuance wherein the processes include accreditation details, links to bank account information and custody and further wherein escrow processing and custody activities of the portal are initiated with each investor registering through the issuance portal to receive the electronic wallet;
   creating by the issuance portal a proxy token that represents a fiat, digital currency or other assets which is used by investors to purchase the digital security and depositing an equivalent amount of the fiat, digital currency or other assets into the unique digital, electronic investor wallets when the passed investors have purchased the digital security from the issuer, and registering the proxy token with a jurisdictional authority that regulates security offerings for the jurisdiction;
   determining by the issuance portal that the digital security offering has been fulfilled;
   creating the digital security based on the data set and the securitization requirements and issuing by the issuance portal the digital security to the passed investors when it has been communicated that the proxy token has been accepted by the jurisdictional authority and the acceptance has been communicated to the issuer back through the issuance portal; and
   depositing by the issuance portal the issued digital security to the unique investor digital wallets.

2. Method of claim 1, wherein the digital security offering is a member of a group consisting essentially of debt, equity, or convertible securities to securitize the infrastructure project.

3. Method of claim 2, wherein the digital security offering is a member of a group consisting essentially of an equity derivative, a debt derivative, a convertible security, and carbon credits.

4. Method of claim 3, wherein the digital currency is a digital token.

5. Method of claim 4, further comprising digitally registering by the issuer on the issuance portal to set up the digital securities offering on the issuance portal.

6. Method of claim 5, further comprising digitally publishing by the issuer through the issuance portal a set of digital documents to be made available to the investor relating to the digital offering and a digital tombstone to provide notice of the digital offering.

7. Method of claim 6, wherein the digital token comprises a cryptocurrency.

8. Method of claim 5, further comprising:
providing a screen to the user interface on the issuance portal which allows the issuer to define key components of the digital issuance; and
inputting through the user interface on the issuance portal a process specifying the issuance of the digital security offering by the issuance portal and performance of the secured asset.

9. Method of claim 8, further comprising creating a digital, electronic system wallet for receiving all deposits from investors and through which all withdrawals to investors are processed.

10. Method of claim 9, further comprising creating a digital, electronic cold wallet by the issuance portal which is each investor's electronic wallet that stores the investor's digital security and cryptocurrency outside of a settlement window, and a digital, electronic hot wallet that provides each investor with their entry point into the digital security's market.

11. Infrastructure management system comprising:
a smart meter connected to an infrastructure project which gathers and ingests data from the infrastructure project and creates a data pipeline of readings made by the smart meter and monitors the data related to the performance of the infrastructure project to further produce data assets that are related to particular administrative uses required by the infrastructure project, the data pipeline being enabled by the smart meter to create the data assets on a continuous, scheduled or modifiable basis;
a distributed ledger adapted to receive the data assets from the smart meter through the data pipeline for recordation of the data assets and for providing referential information relating to jurisdictional requirements provided by a single hash to be used in a digital securities issuance, wherein the distributed ledger has further recorded thereon deal information regarding infrastructure funding documents, funding escrow information, investor security information, security exchange information, and funding distribution information, wherein the distributed ledger is further started and maintained to record investors' equity stakes or shareholder reporting in the infrastructure project and wherein the distributed ledger is further adapted to provide for decentralized secondary market trading of a digital security offering used to securitize the infrastructure project;
a digital security issuance portal adapted to receive the data assets and hash information from the distributed ledger and to produce digital securities issuance based on a revenue profile provided by an issuer of the digital securities to be issued and economic performance of the infrastructure project derived from the data assets, wherein the issuance portal further determines in conjunction with the data on the distributed ledger that the digital security offering has been adequately fulfilled in accordance with offering requirements and the infrastructure funding documents and the issuance portal uses the distributed ledger to provide to clients of an issuer ability to engage in the secondary market trading of the digital security offering; and
a user interface to the digital security issuance portal through which the issuer analyzes the securitization requirements in conjunction with the data set on the distributed ledger and the data on the distributed ledger regarding infrastructure funding documents, funding escrow information, investor security information, security exchange information, and funding distribution information to create a listing of the digital security offering that complies with the jurisdictional requirements of the jurisdictions in which the digital security offering will be issued and creates unique investor digital, electronic wallets on a blockchain established by the issuance portal for investors that are passed to invest in the digital security to be issued in accordance with the digital security offering by accessing a security information screen on the user interface to access the distributed ledger containing the deal information and issues the wallets on a private blockchain established by the issuance portal, wherein the electronic wallets provide to the investors the ability to engage in processes that allow the investors to commit funds to the issuance wherein the processes include accreditation details, links to bank account information and custody and further wherein escrow processing and custody activities of the portal are initiated with each investor registering through the issuance portal to receive the electronic wallet and wherein the user interface further provides the issuer through the issuance portal a security screen to create a proxy token that represents a fiat, digital currency or other assets which is used by investors to purchase the digital security and deposit an equivalent amount of the fiat, digital currency or other assets into the unique digital, electronic investor wallets when the passed investors have purchased the digital security from the issuer, and register the proxy token with a jurisdictional authority that regulates security offerings for the jurisdiction; and
create the digital security based on the data set and the securitization requirements and issuing by the issuance portal the digital security to the passed investors when it has been communicated that the proxy token has been accepted by the jurisdictional authority and the acceptance has been communicated to the issuer back through the issuance portal.

12. System of claim 11, wherein the distributed ledger comprises a blockchain.

13. System of claim 12, wherein the digital security issuance platform comprises a smart contract.

14. System of claim 13, further comprising a payment mechanism to receive payments from customers of the infrastructure and provide transparency to investors in the infrastructure system of the performance of the infrastructure system through the blockchain.

15. System of claim 14, wherein the payment mechanism comprises a credit card swiping device and a near field communication device that communicates with the smart meter.

16. System of claim 15, wherein the smart meter is one of a group consisting essentially of a demand meter, a fuel cell meter, a water meter, a waste management meter, a solar panel meter, an electrical meter, a wind turbine meter, a building system management meter, a supply meter, an energy network meter, a transport meter, a broadband meter, a parking meter.

17. System of claim 14, further comprising a cap table that is created and maintained by the smart contract and which further provides authorization to investors to access information about performance of the asset.

18. System of claim 14, further comprising a new issuance creation mechanism which is triggered when the asset achieves a performance level or goal as defined by the issuer.

19. System of claim 11, further comprising a mechanism for aggregation of variable economic performance outputs across multiple assets.

20. Network for securitizing an infrastructure project that produces an asset comprising:
- a smart meter connected to the infrastructure project which gathers and ingests data from the infrastructure project to create readings made by the smart meter and to monitor the data related to performance of the infrastructure project to further produce data assets that are related to particular administrative uses required by the infrastructure project, the data assets being created on a continuous, scheduled or modifiable basis;
- a distributed ledger that has recorded thereon the data assets, wherein the distributed ledger has further recorded thereon deal information regarding infrastructure funding documents, funding escrow information, investor security information, security exchange information, and funding distribution information, wherein the distributed ledger is further started and maintained to record investors' equity stakes or stakeholder reporting in the infrastructure project and wherein the distributed ledger is further adapted to provide for decentralized secondary market trading of a digital security offering used to securitize the infrastructure project;
- a processor to:
  - receive the data from the smart meter connected to the infrastructure project and the distributed ledger that has recorded thereon the data assets;
  - analyze the data assets and the deal information so that the data set can be used by an issuer to create the digital security for securitizing the infrastructure project;
  - forward the data set to an issuance portal that administers creation of a digital security offering that will be issued to investors and that is used to securitize the infrastructure project, wherein the issuance portal further determines in conjunction with the data on the distributed ledger that the digital security offering has been adequately fulfilled in accordance with offering requirements and the infrastructure funding documents and the issuance portal uses the distributed ledger to provide to clients of the issuer ability to engage in the secondary market trading of the digital security offering;
  - analyze by the issuer through a user interface to the issuance portal a set of securitization requirements defined by an issuer of the digital security offering in conjunction with the data set and the deal information on the distributed ledger and the data on the distributed ledger regarding infrastructure funding documents, funding escrow information, investor security information, security exchange information, and funding distribution information to create a listing of the digital security offering that complies with jurisdictional requirements of the jurisdictions in which the digital security offering will be issued;
  - create unique investor digital, electronic wallets on a blockchain established by the issuance portal for investors that are passed to invest in the digital security to be issued in accordance with the digital security offering by accessing a security information screen on the user interface to access the distributed ledger containing the deal information and issue the wallets on a private blockchain established by the issuance portal;
  - create a proxy token that represents a fiat, digital currency, or other assets which is used by investors to purchase the digital security for depositing an equivalent amount of the fiat, digital currency, or other assets into the unique investor digital, electronic wallets when the passed investors have purchased the digital security from the issuer, and register the proxy token with a jurisdictional authority that regulates security offerings for the jurisdiction;
  - determine that the digital security offering has been fulfilled;
  - create the digital security based on the data set and the securitization requirements and issue the digital security to the passed investors when it has been communicated that the proxy token has been accepted by the jurisdictional authority and the acceptance has been communicated to the issuer back through the issuance portal; and
  - deposit the issued digital security to the unique investor digital, electronic wallets.

21. Network of claim 20, wherein the processor is further adapted to process registering by the issuer on the issuance portal to set up the securities offering on the issuance portal.

22. Network of claim 21, wherein the processor is adapted to process a cryptocurrency.

* * * * *